US008639828B1

(12) United States Patent
Frazier

(10) Patent No.: US 8,639,828 B1
(45) Date of Patent: Jan. 28, 2014

(54) ACCELERATED TCP NETWORK COMMUNICATIONS

(75) Inventor: Jonathan W. Frazier, Mableton, GA (US)

(73) Assignee: Symantec Corporation, Mountain View, CA (US)

(*) Notice: Subject to any disclaimer, the term of this patent is extended or adjusted under 35 U.S.C. 154(b) by 186 days.

(21) Appl. No.: 12/605,772

(22) Filed: Oct. 26, 2009

Related U.S. Application Data

(63) Continuation of application No. 11/163,269, filed on Oct. 12, 2005, now abandoned.

(60) Provisional application No. 60/522,559, filed on Oct. 13, 2004.

(51) Int. Cl.
G06F 15/16 (2006.01)

(52) U.S. Cl.
USPC ............................ 709/230; 709/232; 709/233

(58) Field of Classification Search
USPC .......................................................... 709/230
See application file for complete search history.

(56) References Cited

U.S. PATENT DOCUMENTS

| 6,079,034 A * | 6/2000 | VanZante et al. ............... 714/48 |
| 6,922,724 B1 * | 7/2005 | Freeman et al. ............... 709/223 |
| 7,026,768 B1 * | 4/2006 | Ruiz ......................... 315/185 R |
| 7,324,490 B2 * | 1/2008 | Nishida et al. ................ 370/338 |
| 7,392,323 B2 * | 6/2008 | Yim et al. ..................... 709/236 |
| 7,472,237 B1 * | 12/2008 | Herbst et al. .................. 711/152 |
| 7,565,448 B1 * | 7/2009 | Schlesener et al. ........... 709/242 |
| 2005/0078604 A1 * | 4/2005 | Yim ............................. 370/235 |

* cited by examiner

Primary Examiner — Viet Vu
Assistant Examiner — Keyvan Emdadi
(74) Attorney, Agent, or Firm — Campbell Stephenson LLP

(57) ABSTRACT

The present invention relates to an accelerated process and corresponding computer program for Transmission Control Protocol (TCP) communications with multiple remote computers that results in much greater speed and economy of computer resources. The process decouples the previously connection-oriented nature of TCP and allows it to be used in a much more efficient connection-less manner by combining a process of sending TCP packets out in a connection-less manner and receiving communications by listening on a network interface. The state of communications is tracked by a state table that is updated as the communication process proceeds with TCP communication information and application layer information encapsulated within the TCP communication.

18 Claims, 3 Drawing Sheets

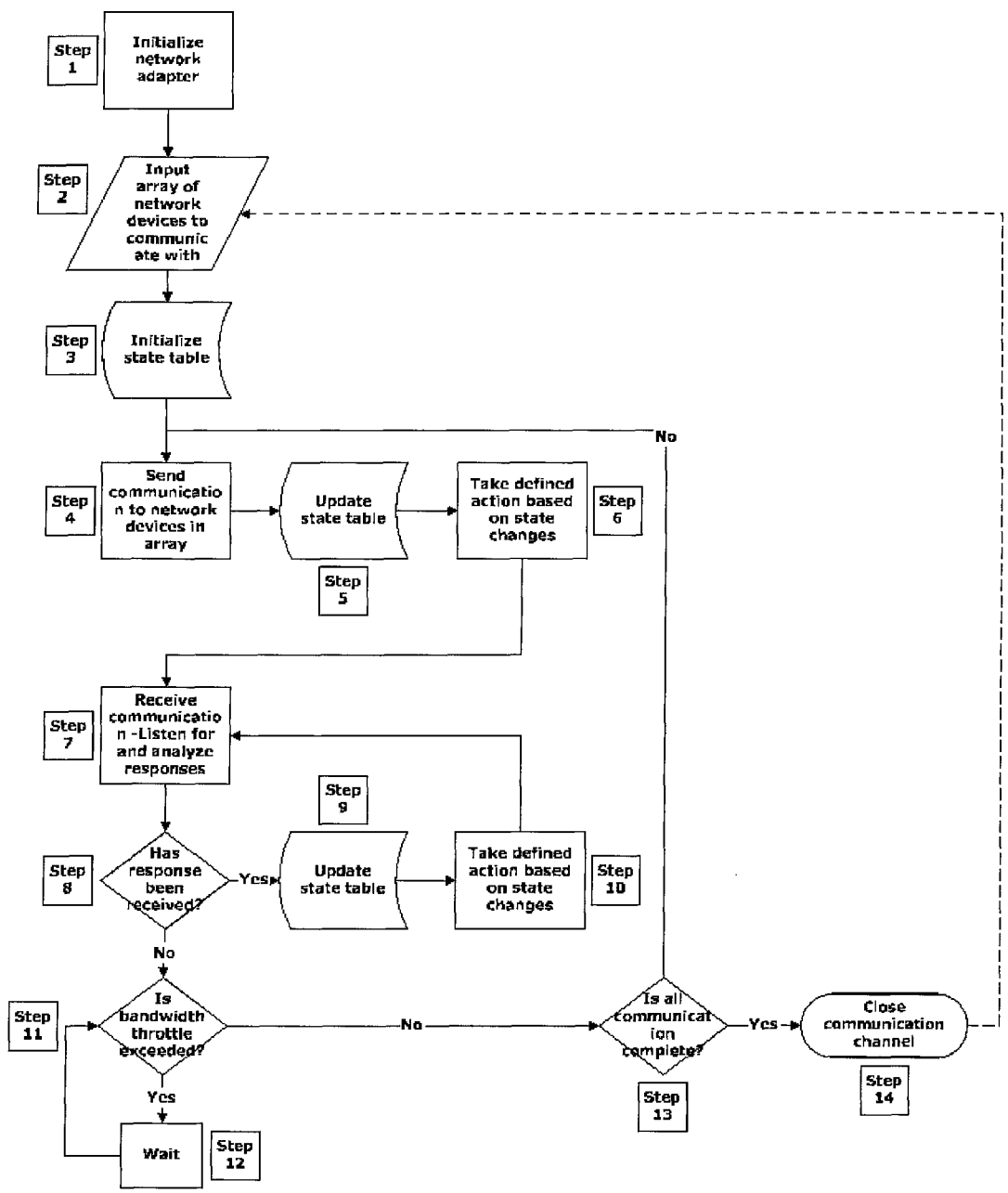

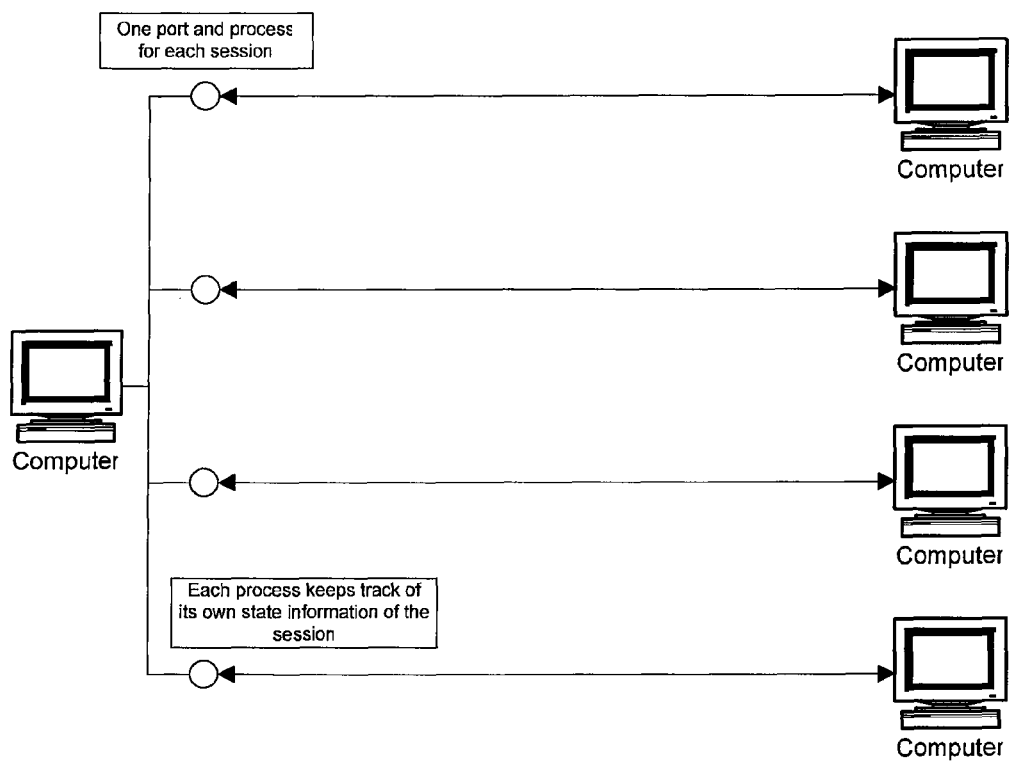
Figure 2 - Current Process for Multiple TCP Network Connections

Figure 3 - New Process for Multiple TCP Network Connections
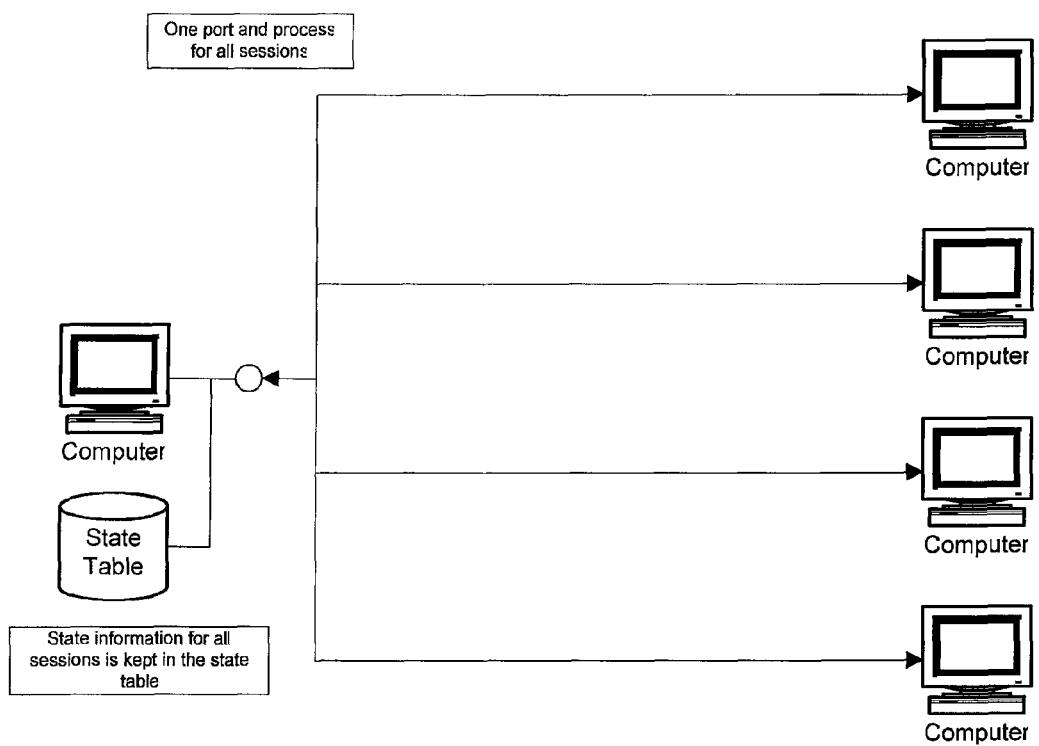

ACCELERATED TCP NETWORK COMMUNICATIONS

CROSS-REFERENCE TO RELATED APPLICATIONS

This application is a continuation of U.S. patent application Ser. No. 11/163,269, filed on Oct. 12, 2005, entitled "High Speed Network (as amended)," and naming Jonathan W. Frazier as the inventor. This application is assigned to Symantec Corporation, the assignee of the present invention, and is hereby incorporated by reference in its entirety and for all purposes as if completely and fully set forth herein. This application also claims the benefit of provisional U.S. Patent Application No. 60/522,559, filed on Oct. 13, 2004, entitled "Accelerated TCP Network Communications," which is hereby incorporated by reference in its entirety and for all purposes as if completely and fully set forth herein.

FEDERALLY SPONSORED RESEARCH

Not Applicable

SEQUENCE LISTING OR PROGRAM

Not Applicable

BACKGROUND OF THE INVENTION

1. Field of Invention

This invention generally relates to network communication between computers, specifically to an accelerated method of conducting Transmission Control Protocol (TCP) communications between a single computer and multiple computers.

2. Prior Art

The most ubiquitous network communications protocol in existence today is TCP over IP (Internet Protocol), otherwise known at TCP/IP. Currently, communication over this protocol requires that at least one unique channel (usually more) be opened between each computer that is communicated with. This is referred to as a session. FIG. 2 shows a depiction of this process. In addition, TCP is a connection-oriented protocol meaning that every message must be acknowledged from the other computer. This acknowledgment requires that the computers wait idle while the other computer responds, slowing the communications process down.

These limitations are especially noticed when one computer communicates with multiple computers. To help speed up communication, multiple connections or sessions are usually handled by a multi-threaded process or a multi-process program. This is processor and memory intensive and there are practical limits to how many threads or processes a computer program can spawn. Each session also requires its own source port to differentiate communications so that the messages are routing to the correct process or thread. This has the following disadvantages:

Sequential communications resulting in time wasted while waiting for replies,

Greater memory consumption for each additional session,

Greater processor utilization for each additional session, and

Greater consumption of available ports.

These disadvantages will become even more pronounced as the amount of network communication increases and available bandwidth increases which is the current rapidly accelerating trend.

3. Objects and Advantages

FIG. 3 shows the new process for multiple TCP connections. Four computers are shown to represent multiple computers from 1 to n. Accordingly, several objects and advantages of the invention are:

Parallel communications resulting in the virtual elimination of time wasted in waiting for replies when communicating with multiple computers, Less memory consumption through the elimination of a separate process for each session, Less processor utilization through the elimination of a separate process for each session, Reduction of port consumption from many to one resulting in more available resources, and Prevention of Denial of Service (DoS) attacks that render a computer useless though consumption of all available ports.

In our working prototypes, we have been able to speed up communications by 300 to 600 times using average computer hardware found on most desktop computers. Further objects and advantages are that this new technique does not require any modification of existing protocols or hardware. Other objects and advantages will become apparent from a consideration of the ensuing description and drawings.

SUMMARY

In accordance with the invention, a process implemented through a computer software program uses a parallel process to manage and track the state of multiple connections. The software program uses one process to send and receive communications between multiple computers or alternatively, one process to send and one process to receive communications between multiple computers. The program keeps track of legitimate connections and the status of communication through a state table kept in memory. The program is also capable of controlling the network bandwidth by adding a throttle when communications are sent, but this is not required.

DRAWINGS-FIGS

FIG. 1 shows the flowcharted process that the computer program follows.

FIG. 2 shows the current process for multiple TCP network connections.

FIG. 3 shows this new process for multiple TCP network connections.

DETAILED DESCRIPTION

Preferred Embodiment-FIGS.

A preferred embodiment of the steps involved in the invention is illustrated in FIG. 1. This embodiment involves a computer running the computer program that will connect to multiple remote computers on a network (client program).

The network adapter of the computer must first be initialized before the accelerated communication can take place, Step 1. The adapter must be initialized to promiscuous mode or a listening state where the computer program has access to all the network traffic that is received by the computer. The computer program will then listen to all incoming network traffic on the same process and thread or a separate process or thread.

Next, Step 2, an array of network devices to be communicated with is input into the computer program. This input can come from many sources, such as, a database, console input, file, web services, etc. The information required for this array would be the IP address of the device at a minimum, but could also include other information such as the destination port and application level information.

Step 3 involves initializing the state table with this information. The state table is an array or hash table held in memory that contains all information about the state of the communication with the remote computers. This information is dependent on the underlying application protocol that is communicated with and is keyed with either the IP address for single sessions with another computer or the IP address and current TCP sequence number for multiple sessions with the same computer, but could be keyed with any information that specifies an individual connection. The state table contains information on the state of the connection such as whether the computer has responded to the last request, if the communication is complete with the computer, application specific information, etc. The state table will vary for every application protocol that it will communicate and how the application protocol will be used. The state table must have information about the network, transport, and application layers to function.

Steps 4 through 11 encompass the cycle where the majority of work takes place. Each cycle represents the actual communication with the remote computers from Step 2. The process will continue until all communication is complete and then end at Step 14 or optionally restart with a new or updated array of remote computers in Step 2.

Step 4 represents the process of sending communication to the remote computers designated in Step 2. The specific request or message will depend upon the application protocol that is being used and the status of communications with the remote computer. The state table is used to keep track of how far along the program is in this process with each remote computer. The first communication would be the three-way handshake that TCP communications requires. Once the connection was established application communication would follow through the same process outlined here.

In each iteration of Step 4, the status found in the state table will determine what responses will be sent. Since the program is now listening for all incoming connections, the source port is not required to change for every connection, one source port for all connections is sufficient, except where multiple communications take place with the same computer. In addition, all communication should be sent out one after the other, without delay. There is no need to wait for a response since all responses will be handled within Step 7 of the program instead of a separate thread or process for each connection. This parallel approach or disconnection with the current serial process of sending TCP communication and waiting for a response is what greatly speeds up communication with multiple computers.

In Step 5, the state table is updated to reflect the communications that were sent in Step 4. This is important so that communications failure can be handled in an appropriate manner, such as resending a communication or marking the remote computer as unresponsive.

Step 6 will take action on the updated state table information. This action would be defined by the purpose of the application using this program or process. For example, the program could be to store the information received, provide some alert or update to another program or system based on what it received, resend information, reply, or continue to send communications, etc.

During Step 7, the program will check if there is any communication received on the listening interface. Any network communication received will then be analyzed by a procedure that can decode the TCP communication and the application protocol.

Step 8 will move immediately to Step 11 if no response has been received. If a response has been received, Step 8 takes the information from the received communication and correlates the information to the state table by IP address and/or sequence number to determine if it is a legitimate response. If the response is legitimate, the state table will be updated to reflect the change in status of the connection in Step 9 with respect to the information received.

Step 10 will take action on the updated state table information. This action would be defined by the purpose of the application using this program or process. For example, the program could be to store the information received or provide some alert or update to another program or system, resend information, reply, or continue to send communications, etc.

Step 11 determines whether the bandwidth throttle has been exceeded. The amount of the throttle could be set statically at the beginning of the program or set dynamically based on changes in the state table or network status. The amount of network traffic that has been sent in Step 4 updates a counter that reflects the amount of bits of information sent in the current second. The program then calculates the amount of time left in the second and determines the amount of time to wait, if necessary, so that the bandwidth throttle is not exceeded. This counter is reset every second but could be any relatively small period of time.

If the throttle is exceeded the program will wait in Step 12 until enough time has passed that more communication can be sent without exceeding the bandwidth limit in the throttle.

Step 13 makes the determination of whether all communication is complete with the remote computers from Step 2. This is determined by the status of the communication in the state table. Each entry in the state table will reflect either that the communication is completed with the remote computer, a communication error occurred, or the remote computer is not responsive. These entries are not all inclusive and other outcomes are possible.

Step 14 closes the communications channels with all remote computers, if any remain to be closed. An option here would be to terminate the program or restart the process with a new set of remote computers to communicate with, or continually run with an updated list of communication requests.

Operation

Preferred Embodiment-FIGS.

A preferred embodiment of the steps involved in the invention is illustrated in FIG. 1. This embodiment involves a computer running the computer program that will connect to multiple remote computers on a network (client program). Processes and threads are used synonymously. Either processes or threads are currently used to manage multiple communications between computers and are also the mechanism that consumes most resources in current TCP communications. These current requirements place many practical limitations on TCP communications to multiple computers. We overcome these limitations with an accelerated method of communication using TCP that takes a completely different approach.

The network adapter of the computer must first be initialized before the accelerated communication can take place, Step 1. The adapter must be initialized to promiscuous mode or a listening state where the computer program has access to all the network traffic that is received by the computer.

In addition, the program sets up communications so that the packet headers can be modified freely by the program. A User Datagram Protocol (UDP) or Internet Control Message Protocol (ICMP) socket is opened for communication so that the operating system will send packets out in a connectionless manner that these protocol use. Also a listening TCP connection is opened on each source port for communication so that the operating system does not inadvertently close the TCP connections created through this UDP or ICMP socket. This listening TCP connection is not used except to prevent the computer from responding in an undesirable way apart from our process and disrupting communications. This could be accomplished by more directly controlling the operating system, but we chose a less involved solution to this problem. When information is sent in Step 4, the packet headers of the UDP or ICMP socket are re-crafted with TCP headers instead of UDP or ICMP. Individual implementations can vary in how this aspect is implemented.

The program does not need access to the network traffic that is sent from the computer in any of the remaining steps. Limiting the computers access to only received traffic helps to optimize the speed of the program. The computer program will then listen to all incoming network traffic on the same process/thread or only one separate process/thread rather than one thread/process for each communication channel to a remote computer.

It is this process of receiving the communication in parallel with one process/thread and using a state table to keep track of the status of connections that greatly speeds up the communications process. This new process has resulted in a 300 to 600 times speed increase over previous standard TCP communications in practice.

Next, Step 2, an array of network devices to be communicated with is input into the computer program. The information is then entered into an array from any appropriate source, for example, a database, console input, file, web services, etc. In our implementation, the information is received from a web service and includes a list of IP addresses to communicate with and any additional parameters such as the bandwidth limit for the bandwidth throttle. The information required for this array would be the IP address of the device at a minimum, but could also include other information such as the destination port if this information was not pre-defined.

Step 3 involves initializing the state table with this information. The state table is an array or hash table held in memory that contains all information about the state of the communication with the remote computers. In this implementation, a hash table is used to store all information about each remote computer the program is communicating with. The hash table is keyed with the IP address of the remote computer, although this can also include a sequence number for multiple connections, but could be keyed with any information that specifies an individual connection. Some information stored in the hash table is dependent on the underlying application protocol that is communicated. The state table contains information on the state of the connection such as whether the computer has responded to the last request, if the communication is complete with the computer, and application specific information.

The application dependant information will include negotiated application session parameters, checkpoints of data transmitted, information returned from the remote computer, etc. The state table will vary for every application protocol that it will communicate and how the application protocol will be used and would be customized for a particular purpose although most information would be standard for network communications. The state table must have information about the network, transport, and application layers to function.

Steps 4 through 11 encompass the cycle where the majority of work takes place. Each cycle represents the actual communication with the remote computers from Step 2. The process will continue until all communication is complete and then end at Step 14 or optionally restart with a new or updated array of remote computers in Step 2. The state table will hold the information about whether the communication is complete.

Step 4 represents the process of sending communication to the remote computers designated in Step 2. The specific request or message will depend upon the application protocol that is being used and the status of communications with the remote computer. The state table is used to keep track of how far along the program is in this process with each remote computer. The first communication would be the three-way handshake that TCP communications requires. Once the connection was established application communication would follow through the same process outlined here.

In each iteration of Step 4, the status found in the state table will determine what responses will be sent. Since the program is now listening for all incoming connections, the source port is not required to change for every connection, one source port for all connections is sufficient. In addition, all communication should be sent out one after the other, without delay. There is no need to wait for a response since all responses will be handled within Step 7 of the program instead of a separate thread or process for each connection. This parallel approach or disconnection with the current serial process of sending TCP communication and waiting for a response is what greatly speeds up communication with multiple computers.

In Step 5, the state table is updated to reflect the communications that were sent in Step 4. This is important so that communications failure can be handled in an appropriate manner, such as resending a communication or marking the remote computer as unresponsive.

Step 6 will take action on the updated state table information. This action would be defined by the purpose of the application using this program or process. For example, the program could be to store the information received or provide some alert or update to another program or system.

During Step 7, the program will check if there is any communication received on the listening interface. Any network communication received will then be analyzed by a procedure that can decode the TCP communication and the application protocol. This step must occur within enough time after Step 4 that no network communication will be lost from the receive buffer of the computer and could be a separate thread that is running constantly while Step 4 is taking place to avoid this problem, but for simplicity is shown linearly in FIG. 1.

Step 8 will move immediately to Step 11 if no response has been received. If a response has been received, Step 8 takes the information from the received communication and correlates the information to the state table by IP address and/or sequence number to determine if it is a legitimate response. If the response is legitimate, the state table will be updated to reflect the change in status of the connection in Step 9 with respect to the information received.

Step 10 will take action on the updated state table information. This action would be defined by the purpose of the application using this program or process. For example, the program could be to store the information received or provide some alert or update to another program or system.

Step 11 determines whether the bandwidth throttle has been exceeded. The amount of the throttle can be set statically at the beginning of the program or be dynamic based on changes in the state table or network status. The amount of network traffic that has been sent in Step 4 updates a counter that reflects the amount of bits of information sent in the current second. The program then calculates the amount of time left in the second and determines the amount of time to wait, if necessary, so that the bandwidth throttle is not exceeded. This counter is reset every second but could be any relatively small period of time.

If the throttle is exceeded the program will wait in Step 12 until enough time has passed that more communication can be sent without exceeding the bandwidth limit in the throttle.

Step 13 makes the determination of whether all communication is complete with the remote computers from Step 2. This is determined by the status of the communication in the state table. Each entry in the state table will reflect either that the communication is completed with the remote computer, a communication error occurred, or the remote computer is not responsive. These entries are not all inclusive and other outcomes are possible.

Step 14 closes the communications channels with all remote computers, if any remain to be closed. An option here would be to terminate the program, restart the process with a new array of remote computers to communicate with, or continually run with an updated list of communication requests.

CONCLUSION, RAMIFICATIONS, AND SCOPE

Accordingly, the reader will see that, according to the invention, the accelerated method provides for significantly faster TCP communications with multiple computers and also results in a much more economical process. In practice, this method can speed TCP communications 300 to 600 times or even more.

While the above description contains many specificities, these should not be construed as limitations on the scope of the invention, but as exemplifications of the presently preferred embodiments thereof. Many other ramifications and variations are possible within the teachings of the invention. For example, using the same method a computer that receives TCP communications (as opposed to initiating the connection which is described as the preferred embodiment) from multiple computers could also realize the same speed and economy benefits of the invention.

Thus the scope of the invention should be determined by the appended claims and their legal equivalents, and not by examples given.

What is claimed is:

1. A network comprising:
a first network device, wherein
  the first network device comprises
    a processor,
    a memory, coupled to the processor, and
    a network adapter, coupled to the processor, and
  the memory is configured to
    initialize the first network device, wherein
      the initializing initializes a source port of the first network device to a listening state,
      the first network device is configured to communicate with a plurality of network devices via a plurality of network connections, and
      each of the plurality of network connections is coupled to the source port,
    identify the plurality of network devices,
    store status information in a state table, wherein
      the state table is stored in the memory, and
      the status information comprises information regarding a state of communication with each of the plurality of network devices via the plurality of network connections,
    receive network communications via the plurality of network connections in a connectionless manner, wherein
      receipt of the network communications comprises updating the status information to indicate that the network communications have been received, and
    control network bandwidth, wherein
      the control of the network bandwidth comprises
        identifying a bandwidth limit,
        identifying an amount of information sent in a current time period, an amount of time remaining in the current time period, and a current bandwidth requirement for the network communications, and
        comparing the current bandwidth requirement with the bandwidth limit;
the plurality of network devices; and
a network, wherein
  the first network device and the plurality of network devices are coupled to one another by the network.

2. The network of claim 1, further comprising:
an application program, wherein
  the application program comprises the state table,
  the application program is stored in the memory and executed by the processor, and
  the application program is configured to maintain the state table.

3. A method comprising:
initializing a first network device, wherein
  the initializing initializes a source port of the first network device to a listening state,
  the first network device is configured to communicate with a plurality of network devices via a plurality of network connections, and
  each of the plurality of network connections is coupled to the source port;
identifying the plurality of network devices;
storing status information in a state table, wherein
  the state table is stored in a non-transitory memory of the first network device, and
  the status information comprises information regarding a state of communication with each of the plurality of network devices via the plurality of network connections;
receiving network communications via the plurality of network connections in a connectionless manner, wherein
  the receiving comprises updating the status information to indicate that the network communications have been received; and
controlling network bandwidth, wherein
  the controlling comprises
    identifying a bandwidth limit,
    identifying an amount of information sent in a current time period, an amount of time remaining in the current time period, and a current bandwidth requirement for the network communications, and
    comparing the current bandwidth requirement with the bandwidth limit.

4. The method of claim 3, further comprising:
  initializing a network adapter of the first network device, wherein
    the initializing initializes the network adapter to a listening state,
    the listening state allows the first network device to access network traffic received by the network adapter, and
    the listening state results in the first network device listening to all incoming network traffic received on the source port, using a single process thread.

5. The method of claim 4, wherein the initializing the network adapter to the listening state causes the network adapter to be in a promiscuous mode.

6. The method of claim 3, wherein
  the information comprises
    information regarding the plurality of network connections, and
    information regarding higher network layers conveyed via the plurality of network connections.

7. The method of claim 3, further comprising:
  receiving a plurality of network device identifiers, wherein
    the network device identifiers are received at the first network device, and
    each of the network device identifiers identifies a corresponding one of the plurality of network devices.

8. The method of claim 7, wherein
  the first network device is configured to receive the network device identifiers from at least one of a plurality of sources, and
  the plurality of sources comprises a database, console input, a file, and a web service.

9. The method of claim 8, wherein
  the each of the network device identifiers comprises individual connection information, and
  the individual connection information is configured to specify an individual network connection of the plurality of network connections.

10. The method of claim 9, wherein
  the individual connection information comprises an Internet Protocol (IP) address.

11. The method of claim 9, wherein
  the individual connection information further comprises at least one of
    a destination port of the first network device identified by the each of the network device identifiers, and
    application-level information for a corresponding application executed by a network device identified by the each of the network device identifiers.

12. The method of claim 3, further comprising:
  receiving a plurality of network device identifiers, wherein
    the initializing further comprises initializing the state table, and
    the initializing the state table comprises
      storing the plurality of network device identifiers in the state table.

13. The method of claim 12, wherein the initializing the state table further comprises:
  storing additional network device information in the state table, wherein
    the additional network device information comprises information regarding the state of network devices identified by each of the plurality of network device identifiers.

14. The method of claim 12, wherein the initializing the state table further comprises:
  storing at least one of network information, transport information, or application-layer information in the state table.

15. The method of claim 3, further comprising:
  determining the bandwidth limit;
  determining whether the bandwidth limit has been exceeded, and
  if the bandwidth limit has been exceeded, interrupting transmission of the network communications for a period of time.

16. The method of claim 15, wherein the determining whether the bandwidth limit has been exceeded comprises:
  updating a value maintained in a counter, wherein
    the counter is updated such that the counter reflects the amount of information sent in the current time period, and
    the amount of information sent in the current time period is represented as a number of bits;
  calculating the amount of time remaining in the current time period;
  calculating the current bandwidth requirement using the value and the amount of time remaining in the current time period;
  if the bandwidth limit has been exceeded, determining the period of time; and
  if the amount of time remaining in the current time period indicates that the current time period has elapsed, resetting the counter.

17. A computer program product comprising:
  a plurality of instructions, comprising
    a first set of instructions, executable by a processor, configured to initialize a first network device, wherein
      the initializing initializes a source port of the first network device to a listening state,
      the first network device is configured to communicate with a plurality of network devices via a plurality of network connections, and
      each of the plurality of network connections is coupled to the source port,
    a second set of instructions, executable by the processor, configured to identify the plurality of network devices,
    a third set of instructions, executable by the processor, configured to store status information in a state table, wherein
      the status information comprises information regarding a state of communication with each of the plurality of network devices via the plurality of network connections,
    a fourth set of instructions, executable by the processor, configured to receive network communications via the plurality of network connections in a connectionless manner, wherein
      receipt of the network communications comprises updating the status information to indicate that the network communications have been received, and
    a fifth set of instructions, executable by the processor, configured to control network bandwidth, wherein
      the control of the network bandwidth comprises
        identifying a bandwidth limit,
        identifying an amount of information sent in a current time period, an amount of time remaining in the current time period, and a current bandwidth requirement for the network communications, and
        comparing the current bandwidth requirement with the bandwidth limit; and
  a non-transitory computer readable storage medium, wherein
    the plurality of instructions are encoded in the non-transitory computer readable storage medium, the first network device further comprises the non-transitory computer readable storage medium, and the processor is coupled to the non-transitory computer readable storage medium.

18. A first network device comprising:

a processor;

a non-transitory memory, coupled to the processor;

a computer-readable storage medium, coupled to the processor; and computer code, encoded in the computer-readable storage medium, configured to cause the processor to:

initialize the first network device, wherein the initializing initializes a source port of the first network device to a listening state, the first network device is configured to communicate with a plurality of network devices via a plurality of network connections, and each of the plurality of network connections is coupled to the source port, identify the plurality of network devices, store status information in a state table, wherein the state table is stored in the non-transitory memory, and the status information comprises information regarding a state of communication with each of the plurality of network devices via the plurality of network connections, receive network communications via the plurality of network connections in a connectionless manner, wherein receipt of the network communications comprises updating the status information to indicate that the network communications have been received, and control network bandwidth, wherein the control of the network bandwidth comprises identifying a bandwidth limit, identifying an amount of information sent in a current time period, an amount of time remaining in the current time period, and a current bandwidth requirement for the network communications, and comparing the current bandwidth requirement with the bandwidth limit.

\* \* \* \* \*